(12) United States Patent
Levine et al.

(10) Patent No.: US 9,145,775 B2
(45) Date of Patent: Sep. 29, 2015

(54) TAPERED THERMAL COATING FOR AIRFOIL

(75) Inventors: Jeffrey R. Levine, Vernon Rockville, CT (US); Shawn J. Gregg, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 819 days.

(21) Appl. No.: 13/410,675

(22) Filed: Mar. 2, 2012

(65) Prior Publication Data

US 2013/0230402 A1   Sep. 5, 2013

(51) Int. Cl.
*F01D 5/18*   (2006.01)

(52) U.S. Cl.
CPC ............... *F01D 5/188* (2013.01); *Y02T 50/676* (2013.01)

(58) Field of Classification Search
CPC ................... F01D 5/286; F01D 5/287; F05D 2230/30–2230/314; F05D 2260/95; F05D 2300/611; F05D 2300/6111
USPC ....................................................... 416/97 R
See application file for complete search history.

(56) References Cited

U.S. PATENT DOCUMENTS

| | | | |
|---|---|---|---|
| 5,490,764 A * | 2/1996 | Schilling ........................ | 416/239 |
| 5,603,603 A | 2/1997 | Benoit et al. | |
| 6,095,755 A | 8/2000 | Houston | |
| 6,126,400 A | 10/2000 | Nichols et al. | |
| 6,884,470 B2 | 4/2005 | Gorman | |
| 7,491,033 B2 * | 2/2009 | Trishkin et al. ............ | 416/241 R |
| 7,828,526 B2 * | 11/2010 | Cairo et al. .................... | 416/224 |
| 7,837,843 B2 | 11/2010 | Sharp et al. | |
| 7,942,638 B2 | 5/2011 | Eichmann et al. | |
| 8,100,654 B1 | 1/2012 | Liang | |
| 2005/0042384 A1 * | 2/2005 | Benedetti et al. ............. | 427/446 |
| 2007/0128027 A1 | 6/2007 | Langley et al. | |
| 2007/0160859 A1 | 7/2007 | Darolia et al. | |
| 2010/0266392 A1 | 10/2010 | Parkos, Jr. et al. | |
| 2011/0052406 A1 | 3/2011 | Bruce et al. | |
| 2011/0103940 A1 | 5/2011 | Duval et al. | |
| 2011/0268584 A1 | 11/2011 | Mittendorf | |
| 2011/0293963 A1 | 12/2011 | Hu et al. | |

OTHER PUBLICATIONS

The International Search Report mailed Nov. 21, 2013 for International Application No. PCT/US2013/027232.

* cited by examiner

*Primary Examiner* — Nathaniel Wiehe
*Assistant Examiner* — Brian O Peters
(74) *Attorney, Agent, or Firm* — Kinney & Lange, P.A.

(57) ABSTRACT

An airfoil comprises pressure and suction surfaces extending axially from a leading edge to a trailing edge and radially from a root section to a tip section, the root section and the tip section defining a span therebetween. A thermal coating extends from the root section of the airfoil toward the tip section of the airfoil. A relative coating thickness of the thermal coating decreases by at least thirty percent at full span in the tip section, as compared to minimum span in the root section.

23 Claims, 3 Drawing Sheets

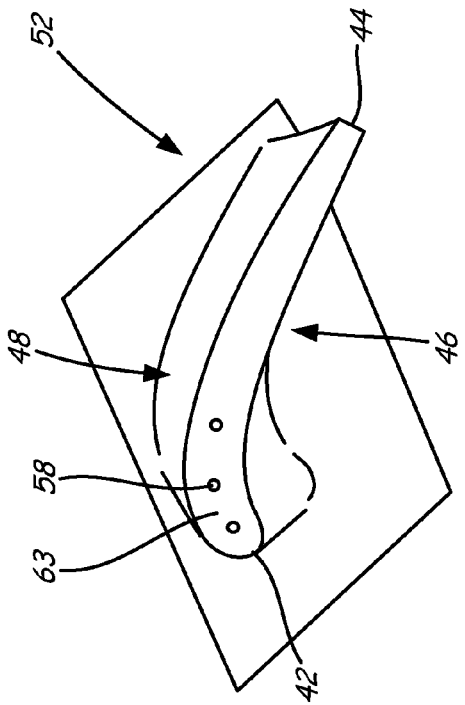
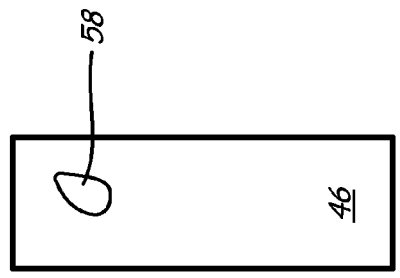
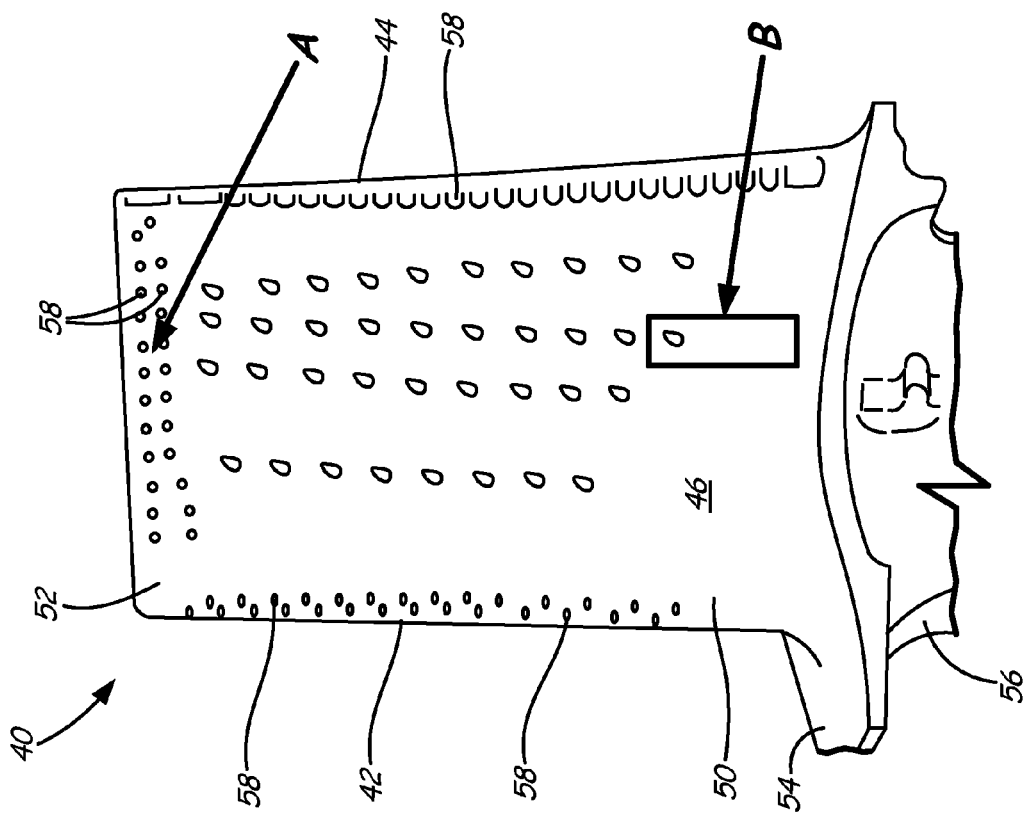
Fig. 1A
Fig. 1B
Fig. 1

TAPERED THERMAL COATING FOR AIRFOIL

BACKGROUND

This invention relates generally to turbomachinery, and specifically to gas turbine engine components. In particular, the invention relates to airfoil components exposed to hot working fluid flow, including, but not limited to, rotor blades and stator vanes for the turbine and compressor section of a turbofan engine, or other gas turbine engine.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Commercial fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Modern aircraft engines generally utilize two and three-spool gas turbine configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant for airfoil components in the hot sections of the compressor and turbine, where advanced cooling configurations and thermal coating systems are utilized in order to improve airfoil performance.

SUMMARY

This invention concerns a tapered thermal coating system for an airfoil. The airfoil has pressure and suction surfaces extending axially from a leading edge to a trailing edge, and radially from a root section to a tip section. The root section and the tip section define the span of the airfoil.

The thermal coating system extends from the root section of the airfoil toward the tip section of the airfoil. The coating system is tapered in relative thickness, where the relative thickness decreases by at least thirty percent at full span in the tip section, as compared to minimum span in the root section.

In additional or alternative embodiments of any of the foregoing embodiments, cooling holes are formed in the tip section of the airfoil. In additional or alternative embodiments of any of the foregoing embodiments, the relative coating thickness has an upper bound (or upper limit), the upper bound decreasing from substantially 100% at midspan to substantially 70% at full span, as compared to a coating thickness of substantially 100% at minimum span. In additional or alternative embodiments of any of the foregoing embodiments, the relative coating thickness of has a lower bound (or lower limit), the lower bound decreasing from substantially 100% at minimum span to 10% at midspan, and the lower bound remaining constant at 10% from midspan to full span.

In additional or alternative embodiments of any of the foregoing embodiments, the upper bound decreases from substantially 100% at minimum span to substantially 70% at full span. In additional or alternative embodiments of any of the foregoing embodiments, the relative coating thickness has a lower bound, the lower bound decreasing from substantially 100% at minimum span to 10% at full span. In additional or alternative embodiments of any of the foregoing embodiments, the relative coating thickness decreases to 50%±20% at full span, as compared to a coating thickness of substantially 100% at minimum span. In additional or alternative embodiments of any of the foregoing embodiments, the relative coating thickness decreases to 50%±10% at full span.

In additional or alternative embodiments of any of the foregoing embodiments, a turbine blade comprises an airfoil as described, where the thermal coating comprises a thermal barrier coating on the airfoil. In additional or alternative embodiments of any of the foregoing embodiments, a gas turbine engine comprises the airfoil.

In additional or alternative embodiments of any of the foregoing embodiments, an airfoil comprises pressure and suction surfaces extending axially from a leading edge to a trailing edge and radially from a root section to a tip section, the root section and the tip section defining a span therebetween. A thermal barrier coating has a relative thickness extending from the root section of the airfoil to the tip section of the airfoil, where the relative thickness decreases from a full thickness of substantially 100% at minimum span in the root section to a reduced thickness of less than 70% at full span in the tip section.

In additional or alternative embodiments of any of the foregoing embodiments, cooling holes are formed in the tip section of the airfoil and between minimum span and midspan. The relative thickness of the thermal coating is reduced adjacent the cooling holes in the tip section of the airfoil, as compared to the cooling holes between minimum span and midspan.

In additional or alternative embodiments of any of the foregoing embodiments, the relative thickness has an upper bound, the upper bound decreasing from substantially 100% at midspan to 70% at full span, as compared to the full thickness of substantially 100% at minimum span. In additional or alternative embodiments of any of the foregoing embodiments, the relative thickness decreases to 50%±20% at full span, as compared to the full thickness of substantially 100% at minimum span. In additional or alternative embodiments of any of the foregoing embodiments, the relative thickness decreases to less than 50% at full span, as compared to the full thickness of substantially 100% at minimum span.

In additional or alternative embodiments of any of the foregoing embodiments, a turbine blade comprises pressure and suction surfaces extending axially from a leading edge to a trailing edge and radially from a root section to a tip section, the root section and the tip section defining a span therebetween. A first set of cooling holes is formed in the tip section of the airfoil, and a second set of cooling holes is formed in the airfoil between minimum span at the root section and midspan. A thermal coating on the airfoil has a relative thickness reduced by at least 30% at full span as compared to a thickness at minimum span.

In additional or alternative embodiments of any of the foregoing embodiments, the relative thickness of the thermal coating is reduced adjacent the first set of cooling holes, as compared to the second set of cooling holes. In additional or alternative embodiments of any of the foregoing embodiments, the thermal coating comprises an yttria stabilized ceramic. In additional or alternative embodiments of any of the foregoing embodiments, the thermal coating comprises an yttria-stabilized zirconia coating. In additional or alternative embodiments of any of the foregoing embodiments, the thermal coating comprises a zirconia-based coating.

In additional or alternative embodiments of any of the foregoing embodiments, the thermal coating has a relative thickness of 50%±10% at full span, as compared to the thickness at minimum span. In additional or alternative embodiments of any of the foregoing embodiments, the relative thickness of the thermal coating is substantially constant from minimum span to midspan, within a tolerance of 20%. In additional or alternative embodiments of any of the foregoing embodiments, the relative thickness of the thermal coating has an upper bound, the upper bound decreasing from substantially 100% at midspan to substantially 70% at full span, as compared to the thickness at minimum span.

BRIEF DESCRIPTION OF THE DRAWINGS

FIG. 1 is perspective view of an airfoil protected by a tapered thermal coating.

FIG. 1A is enlarged view of the tip section of the airfoil, showing reduced wear effects as provided by the tapered thermal coating system.

FIG. 1B is an enlarged view of the pressure surface of the airfoil, showing reduced wear effects as provided by the tapered thermal coating system.

DETAILED DESCRIPTION

Figure 2:
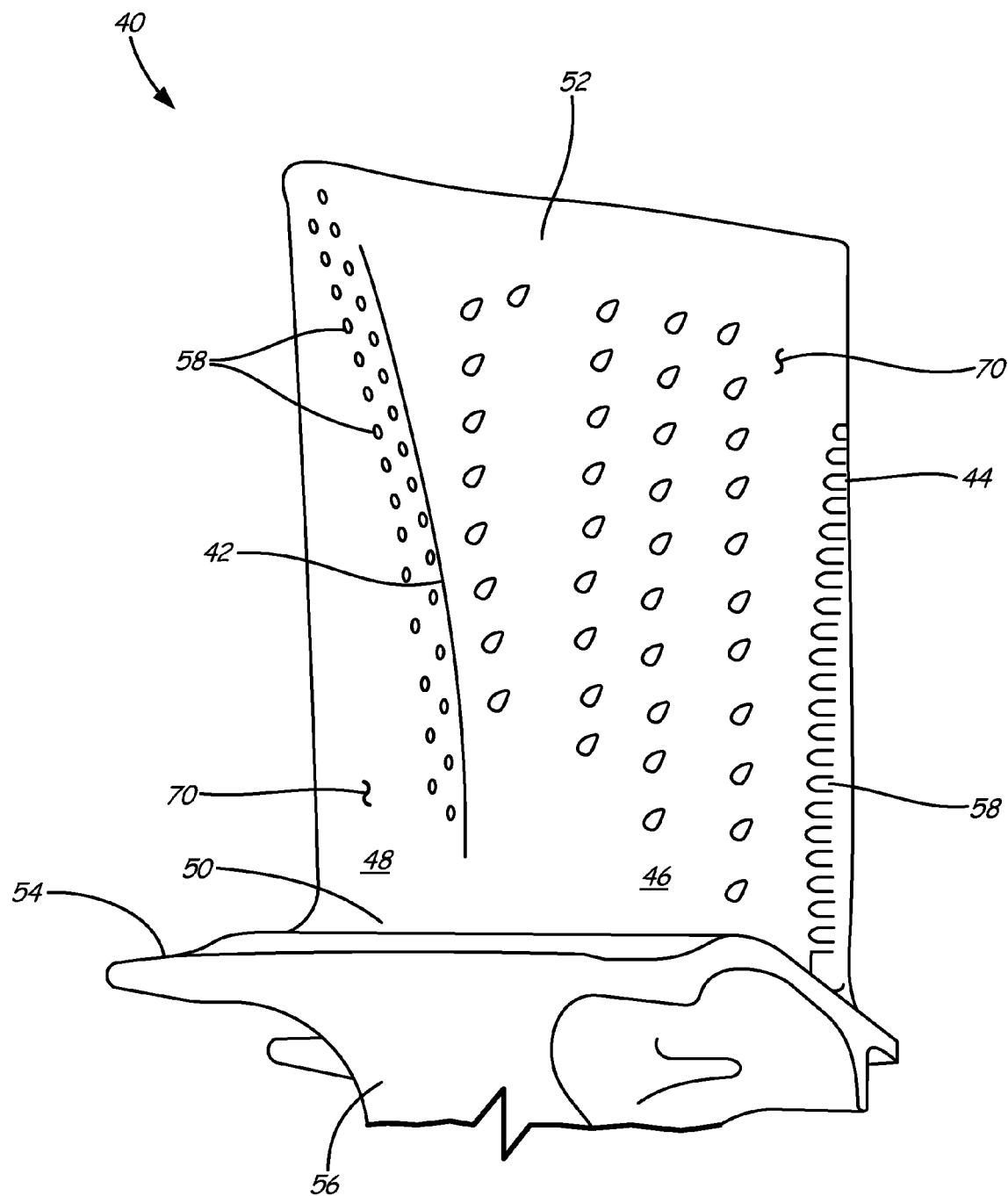
FIG. 2 is a perspective view of an airfoil with the tapered thermal coating.

FIG. 1 is perspective view of airfoil 40 for a gas turbine engine, protected by a tapered thermal coating system. Airfoil 40 extends axially from leading edge 42 to trailing edge 44 along pressure surface 46 (front) and suction surface 48 (back; see FIG. 1A). Pressure (concave) surface 46 and suction (convex) surface 48 extend radially from root section 50 to tip section 52 of airfoil 40. Platform 54 is coupled to airfoil 40 adjacent root section 50, with root attachment 56 on the radially inner portion of platform 54.

A tapered thermal coating system (see FIGS. 2 and 3) is applied to one or more external surfaces of airfoil 40, including, but not limited to, leading edge 42, trailing edge 44, pressure surface 46, suction surface 48, root section 50, tip section 52, and platform 54. The thermal coating may also be removed after engine running in order to examine reduced wear on airfoil 40, as compared to other airfoils without a tapered coating system. In this particular example, engine-run airfoil 40 shows reduced wear effects including reduced or substantially no cracking, erosion or oxidation along tip section 52 (see also FIG. 1A), and reduced or substantially no cracking along cooling holes 58 adjacent root section 50 (see also FIG. 1B).

In rotor blade applications of airfoil 40, platform 54 has attachment 56 for mounting airfoil 40 to a rotor hub or disk, for example in the compressor or turbine section of a gas turbine engine, or other turbomachine. Tip section 52 may be unshrouded, as shown in FIG. 1, or shrouded. In stator vane applications of airfoil 40, attachment 56 may be configured for mounting airfoil 40 to an engine casing or other static structure at inner diameter (ID) platform 54, and a corresponding outer diameter (OD) platform 54 may be provided adjacent tip section 52. Alternatively, stator vane airfoils 40 may be cantilever mounted, for example with an OD platform attached to a compressor or turbine casing and an ID section positioned with rotational clearance to a hub, disk or rotor.

Airfoil 40 may have cooling holes 58, for example in tip section 52. Depending on application, additional cooling holes 58 may be provided along one or more other surfaces of airfoil 40, for example leading edge 42, trailing edge 44, pressure surface 46, suction surface 48, (ID or OD) platform 54, or combinations thereof. Alternatively, airfoil 40 may be internally cooled, without cooling holes 58, or uncooled.

FIG. 1A is an enlarged view of tip section 52 of engine-run airfoil 40, extending from leading edge 42 to trailing edge 44 along concave pressure surface 46 (bottom) and convex suction surface 48 (top). In some designs, cooling holes 58 are provided in the radially outer surface of tip section 52, for example along a squealer pocket or other tip feature 63. As shown in FIG. 1A, tip section 52 of airfoil 40 has reduced or substantially no wear effects such as oxidation, erosion and cracking, as compared to other airfoils without a tapered coating system.

FIG. 1B is an enlarged view of pressure surface 46 of engine-run airfoil 40, with cooling hole 58 located adjacent root section 50. As shown in FIG. 1B, pressure surface 46 and cooling hole 58 show reduced or substantially no wear effects such as cracking, as compared to other airfoils without a tapered coating system.

As turbine inlet, compressor outlet and other gas path temperatures increase to improve engine thrust and cycle efficiency, advanced technologies and coating systems are required to cool airfoils 40, while minimizing the amount of cooling fluid flow through cooling holes 58. One particular technology that has been used is a low conductivity thermal coating system, for example a ceramic thermal barrier coating (TBC). Alternatively, the coating composition varies, and may include one or more of a ceramic TBC coating, a bond coating, a NiCrAlY coating, a zirconia-based coating or an yttria-stabilized coating, and combinations thereof, for example an yttria-stabilized zirconia coating, without or without a bond coat.

In order to reduce airfoil metal temperatures, there is a desire to apply thicker ceramic (or other) thermal coatings to airfoil 40, for example 10 mil (0.010", or 0.254 mm) or more, across substantially the entire span of airfoil 40, from root section 50 to tip section 52. In some designs, a thermal coating (or other coating) may also be applied to platform 54. While thicker coatings provide additional protection to root section 50 of airfoil 40, greater coating thickness may also lead to blockage of cooling holes 58 in tip section 52, reducing cooling efficiency and resulting in oxidation, erosion and cracking, as described above. Similarly, while thinner coatings may be applied to reduce blockage of cooling holes 58, less coating thickness may not provide sufficient protection to prevent damage to root section 50, for example thermal mechanical fatigue (TMF) cracking around cooling holes 58. These problems are addressed by tapering the thermal coating system for airfoil 40, as shown in FIG. 2 and FIG. 3.

Figure 3:
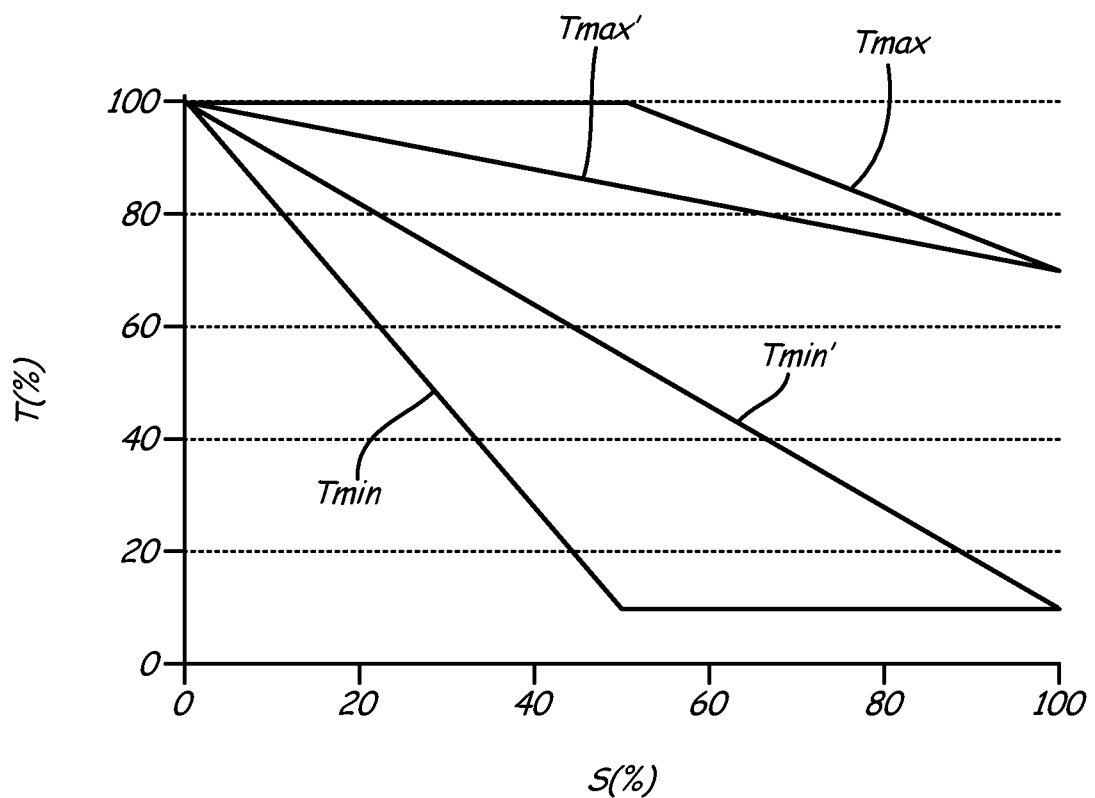
FIG. 3 is a plot of thermal coating thickness versus span.

FIG. 2 is a perspective view of airfoil 40 for a gas turbine engine, with tapered thermal coating system 70. Airfoil 40 extends axially from leading edge 42 to trailing edge 44 along pressure surface 46 (front or right side) and suction surface 48 (back or left side). Pressure (concave) surface 46 and suction (convex) surface 48 extend radially from root section 50 to tip section 52. Platform 54 is mounted to airfoil 40 adjacent root section 50, with root attachment structure 56 as described above.

Thermal coating system 70 for airfoil 40 is provided in a tapered configuration, with relatively greater thickness along portions of airfoil 40 toward root section 50, for example to prevent TMF crack formation in regions where the number of cooling holes 58 is limited due to centrifugal stress considerations, as described above. In addition, thermal coating system 70 has relatively less thickness toward tip section 52, as compared to a thicker, untapered coating system, for example to reduce blockage or coat-down of cooling holes 58, or to improving service life and reliability by decreasing erosion, oxidation and TFM crack formation.

Some airfoils may be subject to various wear effects during engine running, including thermal effects, cracking, erosion and oxidation. The tapered configuration of thermal coating system 70, however, provides airfoil 40 with substantially improved protection, resulting in less or substantially no cracking, erosion and oxidation of the airfoil substrate, particularly in tip region 52 and adjacent cooling holes 58, as described above. Tapered thermal coating system 70 also improves cooling efficiency, because the reduced coating thickness allows the shape of cooling holes 58 to be more carefully controlled in the diffusion (outlet) region, for more uniform coverage and reduced cooling flow requirements.

Based on these considerations, the thickness of coating system 70 varies along the span of airfoil 40. In one application, for example, the relative coating thickness decreases by a factor of at least two between root section 50 and tip section 52, for example from 10 mil (0.254 mm) or more in root section 50 to 5 mil (0.127 mm) or less in tip section 52. Alternatively, the relative coating thickness decreases by 30% or more, for example from 10 mil (0.254 mm) or more in root section 50 to 7 mil (0.188 mm) or less in tip section 52. In other applications, the relative coating thickness decreases by a factor of five or more between root section 50 and tip section 52, for example from 10 mil (0.254 mm) or more in root section 50 to 2 mil (0.0508 mm) or less in tip section 52, or to 1 mil (0.0254 mm) or less in tip section 52.

In some of these applications, the relative coating thickness tapers to zero between root section 50 and tip section 52, for example from 10 mil (0.254 mm) or more in root section 50 to substantially 0.0 mil (0.0 mm) in tip section 52, or to substantially 0.0 mil (0.0 mm) in a location between midspan and tip section 52.

In each of these configurations, moreover, the overall thickness of thermal coating system 70 may be scaled. For example, the maximum thickness may be 10-20 mil (0.254-0.508 mm) or more in root section 50, scaling to 5-10 mil (0.127-0.254 mm) or less in root section 50. That is, the tapered or reduced thickness in tip section 52 may be scaled according to the nominal or increased thickness in root section 50.

To obtain this reduced coating thickness in tip section 52 of airfoil 40, a shadow bar can be used to effectively mask airfoil tip section 52 during the coating process. For thermal coating system 70, the coating thickness is thus tapered from a greater thickness in root section 50 of airfoil 40 to a reduced thickness in tip section 52, for example by at least 30%, 50% or more, scaled to the nominal root section thickness as described above.

The reduced relative thickness of thermal coating system 70 toward tip section 52 of airfoil 40 may be selected to provide thermal barrier protection without substantially closing or blocking any cooling holes 58, in order to improve cooling film effectiveness. This contrasts with other designs, where thicker coatings in tip section 52 may block or even completely fill the diffuser portions of cooling holes 58, substantially reducing film cooling effectiveness.

At the same time, the increased (relative) thickness of thermal coating system 70 toward root section 50 of airfoil 40 may be selected to provide additional thermal barrier protection toward platform 54, where cooling holes 58 may be absent or limited in number due to stress and strain considerations, as described above, or for other reasons. This contrasts with other designs in which the coating thickness is not tapered as described here but instead reduced more uniformly across airfoil 40, for example to address blockage of cooling holes 58 in tip section 52, thus leaving areas of root section 50 with less thermal protection.

With tapered thermal coating system 70, airfoil 40 has superior durability over a range of span regions, including both root section 50 and tip section 52. This approach can also be applied to the midspan region, between root section 50 and tip section 52, for example extending continuously from root section 50 through midspan to tip section 52.

FIG. 3 is a coating thickness profile for an airfoil, for example airfoil 40 of FIG. 2. Coating thickness T is plotted on the vertical axis, in relative or normalized values ranging between 0 and 100%. Relative span S is given along the horizontal axis, with relative span S=0 at the root or inboard section, relative span S=50% at midspan, and relative span S=100% at the tip or outboard section.

In some applications, the relative coating thickness (T) may be bounded by upper and lower limits defined along a particular regions across relative span S. For example, relative coating thickness T may remain at or below an upper limit $T \leq T_{max}$, where $T_{max}$ remains substantially constant at a full thickness of 100% from minimum or root span (S=0) to midspan (S=50%), decreasing from midspan to $T_{max}$=70% at full or maximum (tip) span (S=100%). Relative coating thickness T may also remain at or above a lower limit $T \geq T_{min}$, for example where $T_{min}$ decreases from a full thickness of 100% at minimum span to $T_{min}$=10% at midspan, remaining substantially constant at $T_{min}$=10% from midpan to full span (see Table 1). As used here, substantially constant includes an application tolerance of about 10%, or up to 20%, depending on coating technique. As used here, decreasing may mean decreasing monotonically or linearly, or both, as shown in FIG. 3, or decreasing in another form, such as exponentially or along a spline, power law or polynomial curve. The coating thickness may also decrease strictly monotonically (that is, always decreasing) between two span locations, or the coating thickness may be substantially constant (non-increasing) at one or more span locations between the two points. Further, the coating thickness may vary within the coating tolerance along the span, as described above.

TABLE 1

Relative Coating Thickness (T) and Relative Span Height (S)

| S (%) | Tmin (%) | Tmax (%) | Tmin' (%) | Tmax' (%) |
|---|---|---|---|---|
| 0 | 100 | 100 | 100 | 100 |
| 10 | 82 | 100 | 91 | 97 |
| 20 | 64 | 100 | 82 | 94 |
| 30 | 46 | 100 | 73 | 91 |
| 40 | 28 | 100 | 64 | 88 |
| 50 | 10 | 100 | 55 | 85 |
| 60 | 10 | 94 | 46 | 82 |
| 70 | 10 | 88 | 37 | 79 |
| 80 | 10 | 82 | 28 | 76 |
| 90 | 10 | 76 | 19 | 73 |
| 100 | 10 | 70 | 10 | 70 |

Somewhat narrower coating thickness ranges may also be defined, for example with upper limit $T_{max}'$ decreasing from a full thickness of 100% at minimum span to $T_{max}'$=70% at full span. Similarly, lower limit $T_{min}'$ may decrease from a full thickness of 100% at minimum span to $T_{min}'$=10% at full span. Alternatively, the change in relative coating thickness T may be expressed somewhat more broadly, for example a decrease of 30%, 50% or more at full span; that is, from a full thickness of 100% at minimum span to a reduced thickness $T \leq 70\%$ or $T \leq 50\%$ at full span.

Further, the decrease in thickness may include a coating thickness of substantially zero, for example tapering to zero thickness in a location between midspan and full span, or tapering to zero thickness at full span. Alternatively, relative coating thickness T may decrease to a particular range, for example from a full thickness of 100% at minimum span to a thickness between 10% and 70% at full span, or between 20% and 70% at full span. Further, relative coating thickness T may decrease from a full thickness of 100% at minimum span to a reduced thickness of 50%±10% at full span, or 50%±20% at full span.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

The invention claimed is:

1. An airfoil comprising:
    pressure and suction surfaces extending axially from a leading edge to a trailing edge and radially from a root section to a tip section, the root section and the tip section defining a span therebetween; and
    a thermal coating extending from the root section of the airfoil toward the tip section of the airfoil, wherein a relative coating thickness of the thermal coating decreases by at least thirty percent at full span in the tip section, as compared to a relative coating thickness at minimum span in the root section.

2. The airfoil of claim 1, further comprising cooling holes formed in the tip section of the airfoil.

3. The airfoil of claim 1, wherein an upper bound of the relative coating thickness is substantially 100% at midspan decreasing to substantially 70% at full span, as compared to a relative coating thickness of substantially 100% at minimum span.

4. The airfoil of claim 3, wherein a lower bound of the relative coating thickness is substantially 100% at minimum span decreasing to 10% at midspan, and the lower bound remaining constant at 10% from midspan to full span.

5. The airfoil of claim 1, wherein an upper bound of the relative coating thickness decreases from substantially 100% at minimum span to 70% at full span.

6. The airfoil of claim 5, wherein a lower bound of the relative coating thickness is substantially 100% at minimum span decreasing to 10% at full span.

7. The airfoil of claim 1, wherein the relative coating thickness at full span is nominally 50%, within a tolerance of 20%, as compared to a relative coating thickness of substantially 100% at minimum span.

8. The airfoil of claim 7, wherein the tolerance is 10%.

9. A turbine blade comprising the airfoil of claim 1, wherein the thermal coating comprises a thermal barrier coating on the airfoil.

10. A gas turbine engine comprising the turbine blade of claim 9.

11. An airfoil comprising:
    pressure and suction surfaces extending axially from a leading edge to a trailing edge and radially from a root section to a tip section, the root section and the tip section defining a span therebetween; and
    a thermal barrier coating having a relative thickness extending from the root section of the airfoil to the tip section of the airfoil, wherein the relative thickness decreases from a full thickness of substantially 100% at minimum span in the root section to a reduced thickness equal to or less than 70% at full span in the tip section.

12. The airfoil of claim 11, further comprising a first plurality of cooling holes formed in the tip section of the airfoil and a second plurality of cooling holes between minimum span and midspan, wherein the relative thickness of the thermal coating is reduced adjacent to the first plurality of cooling holes in the tip section of the airfoil, as compared to a relative coating thickness adjacent to the second plurality of cooling holes between minimum span and midspan.

13. The airfoil of claim 11, wherein the relative thickness has an upper bound, the upper bound decreasing from substantially 100% at midspan to 70% at full span, as compared to the full thickness of substantially 100% at minimum span.

14. The airfoil of claim 13, wherein the relative thickness at full span is nominally 50%, within a tolerance of 20%, as compared to the full thickness of substantially 100% at minimum span.

15. The airfoil of claim 13, wherein the relative thickness decreases to less than 50% at full span, as compared to the full thickness of substantially 100% at minimum span.

16. A turbine blade comprising:
pressure and suction surfaces extending axially from a leading edge to a trailing edge and radially from a root section to a tip section, the root section and the tip section defining a span therebetween;
a first set of cooling holes formed in the tip section of the airfoil;
a second set of cooling holes formed in the airfoil between minimum span at the root section and midspan; and
a thermal coating on the airfoil, the thermal coating having a relative thickness reduced by at least 30% at full span as compared to a thickness at minimum span.

17. The turbine blade of claim 16, wherein the relative thickness of the thermal coating is reduced adjacent the first set of cooling holes, as compared to the second set of cooling holes.

18. The turbine blade of claim 17, wherein the thermal coating comprises an yttria stabilized ceramic coating.

19. The turbine blade of claim 18, wherein the thermal coating comprises an yttria-stabilized zirconia coating.

20. The turbine blade of claim 17, wherein the thermal coating comprises a zirconia-based coating.

21. The turbine blade of claim 16, wherein the thermal coating has a nominal relative thickness at full span of 50%, within a tolerance of 10%, as compared to the thickness at minimum span.

22. The turbine blade of claim 16, wherein the relative thickness of the thermal coating is substantially constant from minimum span to midspan, within a tolerance of 20%.

23. The turbine blade of claim 22, wherein the relative thickness of the thermal coating has an upper bound, the upper bound decreasing from substantially 100% at midspan to 70% at full span, as compared to the thickness at minimum span.

* * * * *